United States Patent [19]

Benner

[11] Patent Number: 5,170,729

[45] Date of Patent: Dec. 15, 1992

[54] FERTILIZER DISPENSER WITH CLOSURE AT POINTED TIP

[76] Inventor: Barry Benner, 3992 Joshua La., Douglasville, Ga. 30135

[21] Appl. No.: 711,992

[22] Filed: Jun. 7, 1991

[51] Int. Cl.⁵ .............................................. A01C 15/00
[52] U.S. Cl. ...................................... 111/7.2; 111/95; 111/92; 111/96; 111/99; 222/191; 222/509
[58] Field of Search ...................... 111/7.1, 7.2, 92, 95, 111/96, 98, 99; 222/561, 191, 510, 509

[56] References Cited

U.S. PATENT DOCUMENTS

| | | | |
|---|---|---|---|
| 1,911,692 | 5/1932 | Jalandoni | 111/95 |
| 2,555,855 | 2/1947 | Masters | 111/7.2 |
| 4,290,374 | 9/1981 | Maples | 111/7.2 X |
| 4,413,440 | 11/1983 | Schultz | 111/95 X |

FOREIGN PATENT DOCUMENTS 465713 9/1928 Fed. Rep. of Germany ....... 111/7.2

Primary Examiner—Randolph A. Reese
Assistant Examiner—Timothy Aberle
Attorney, Agent, or Firm—Richard C. Litman

[57] ABSTRACT

A device for dispensing a quantity of granular fertilizer to an underground location. The device consists of an inner and outer tubular section with the inner tube being hollow. Both tubular sections have a lower pointed end and the inner tube is rotatably disposed within the outer tube. An inner opening and outer opening are located at the lower end of the inner and outer tubes. A funnel is provided on the inner tube as well as a handle which actuates the rotation of the inner tube. Another handle is provided on the outer tube. When the handles are in alignment the openings are not in alignment. This forms a solid outer tube. The inner tubular section is filled with fertilizer, the handles grasped firmly and the device is thrust into the ground. The inner handle is then rotated 90 degrees bringing the inner and outer openings into alignment. The device is then removed from the ground, leaving the fertilizer in the hole formed by the displaced soil.

16 Claims, 5 Drawing Sheets

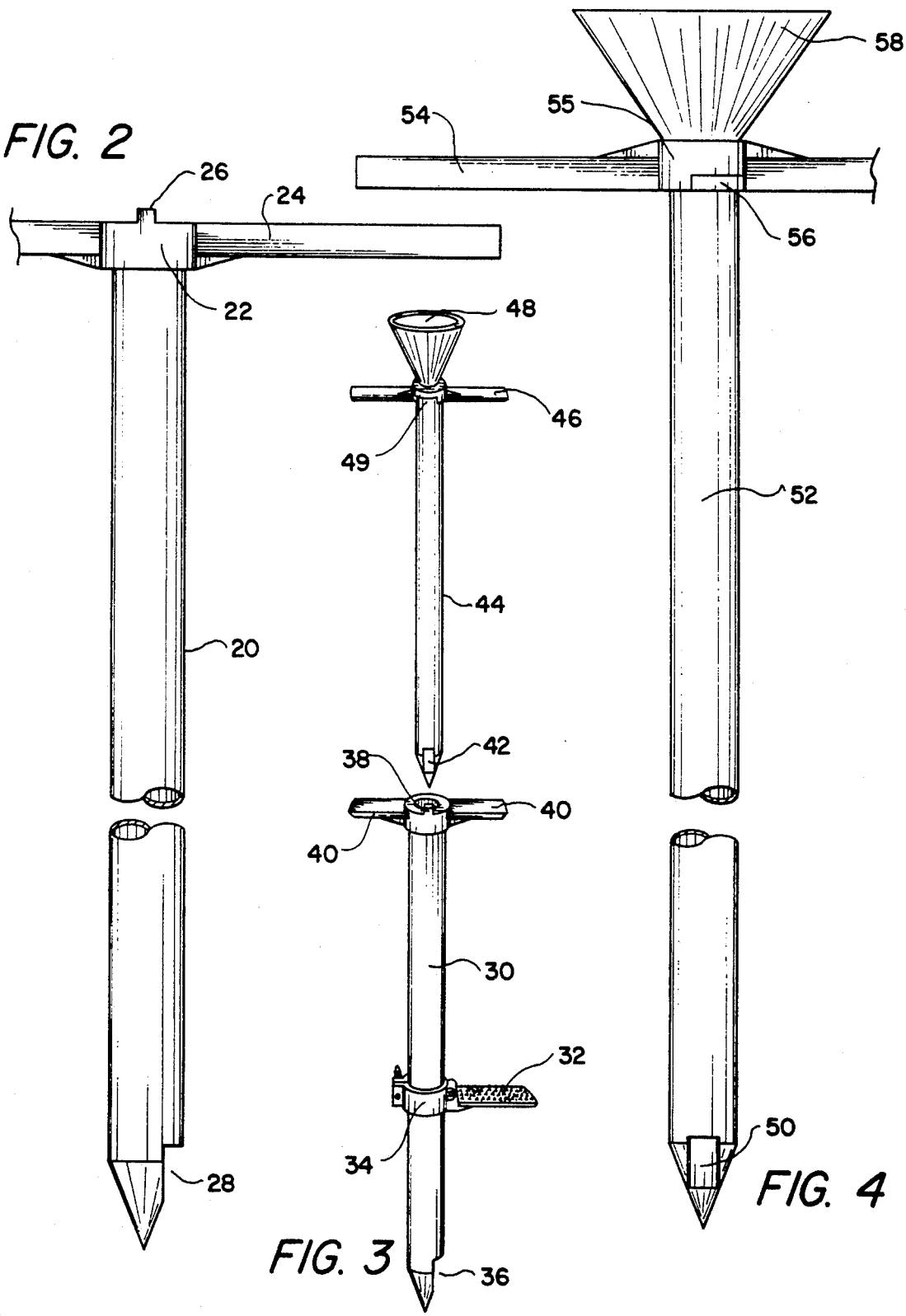

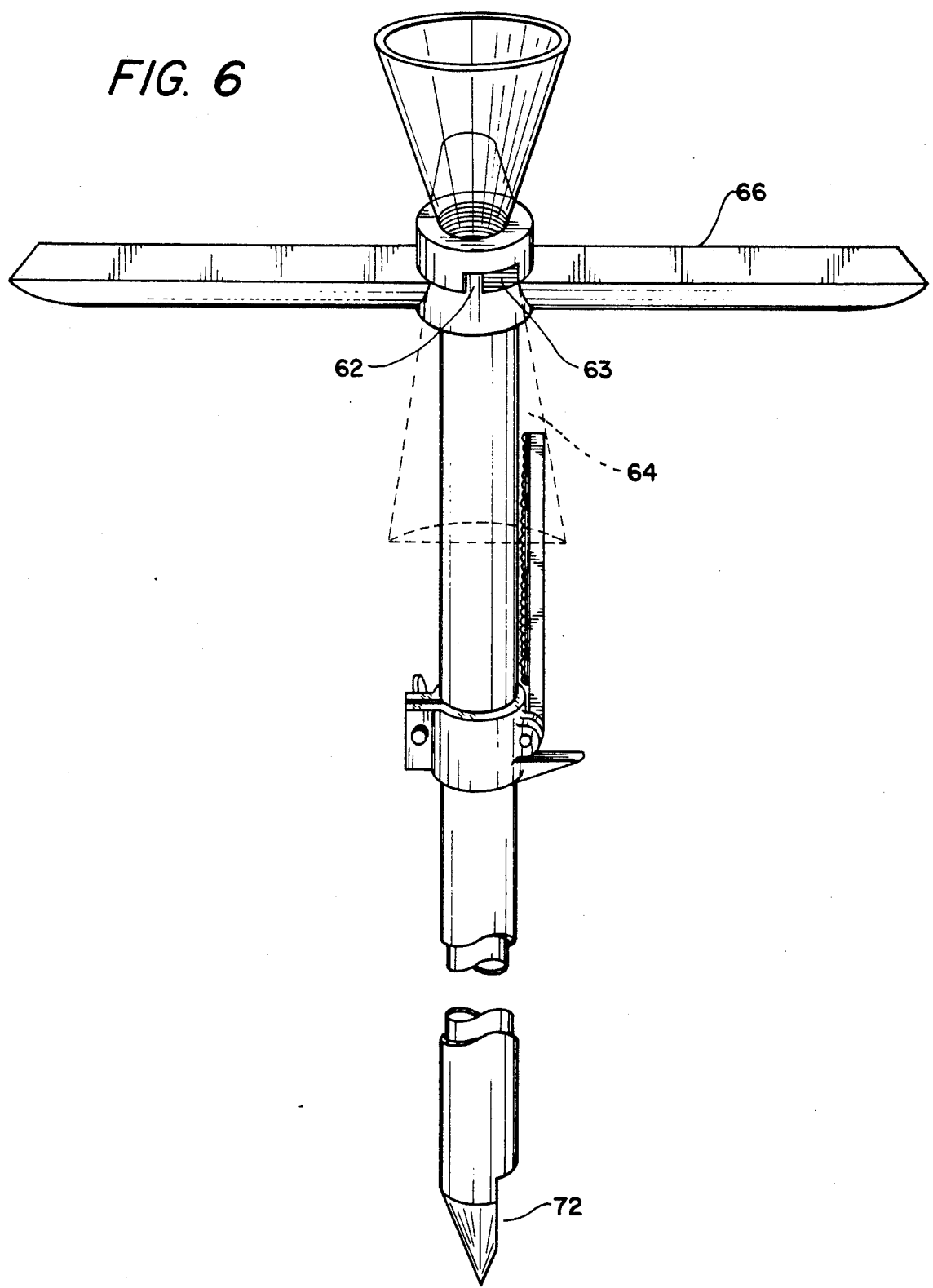

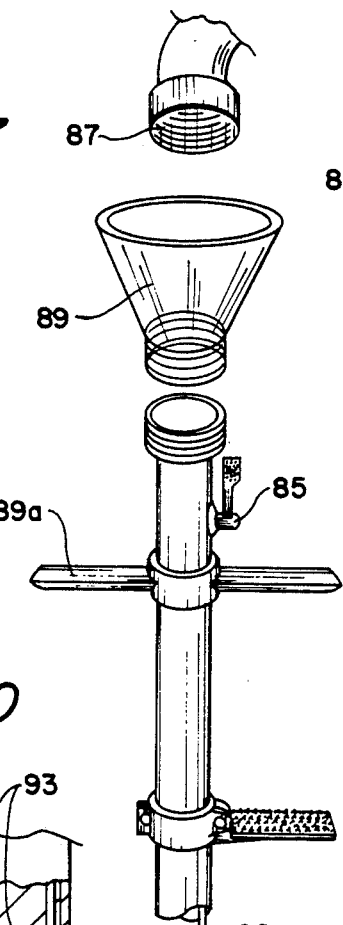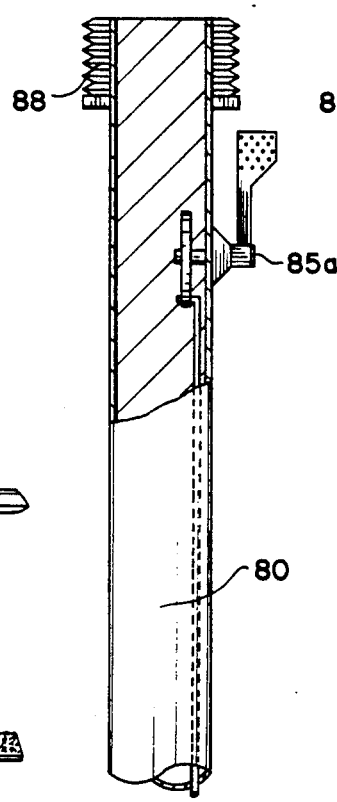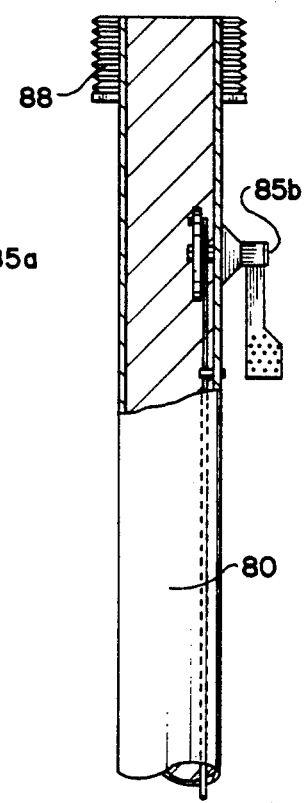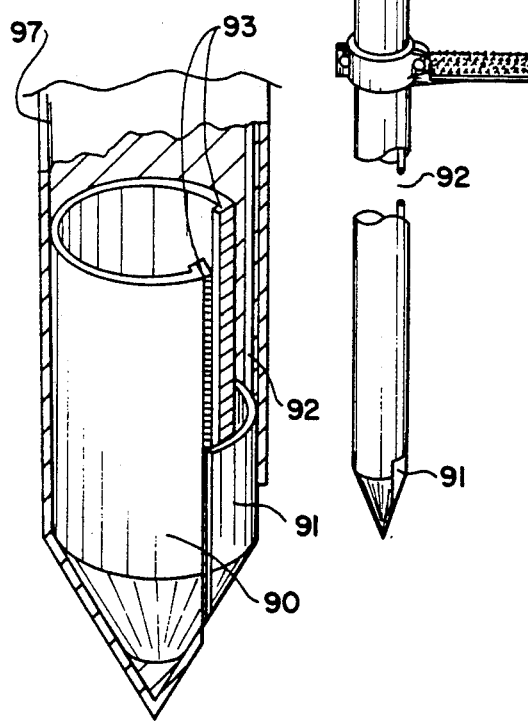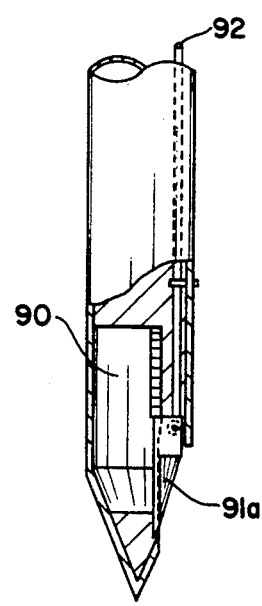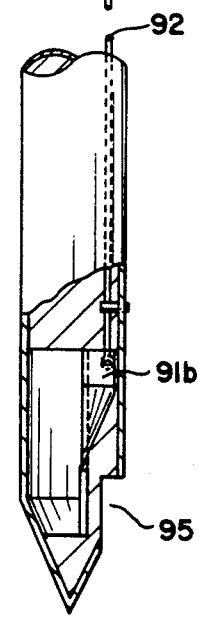

FERTILIZER DISPENSER WITH CLOSURE AT POINTED TIP

FIELD OF THE INVENTION

This invention relates generally to an apparatus for dispensing fertilizer into the soil in an optimum position for maximum plant fertilization. More particularly, the invention relates to a device for dispensing a controlled amount of fertilizer in a subsoil near a plant root system in an efficient and simple manner.

DESCRIPTION OF THE PRIOR ART

The prior art discloses several devices which deliver fertilizer to plant root systems.

U.S. Pat. No. 3,118,402 issued to Nelson discloses an elongate injector for applying a fluid to the soil around the roots of plants. The device is hollow and has at least one orifice near the tip for dispensing fluid. A valve is provided to control flow.

U.S. Pat. No. 3,757,469 issued to Smith et al. discloses an irrigating and feeding device having valve means in which one or more orifices may be uncovered.

U.S. Pat. No. 3,916,564 issued to Crowell, Sr. discloses a water, food and medication applicator for plants. It has a tubular sleeve housing and a spike for ground penetration.

U.S. Pat. No. 4,934,287 issued to Guin et al. discloses a fertilizer injection system. The apparatus has a multi-valve holding chamber and a ground penetrating section.

Other prior art devices are constructed with conical or tapered ends which allow for the forced insertion of the device. Openings at the end of one such device allows water to flow into the root system in the subsoil. At the time of insertion; however, soil may actually clog and obstruct the openings thus restricting the flow through the openings.

Some devices are also designed for a 'one plant' use, remaining as a permanent feeder/waterer for one particular bush, tree or area.

In general, prior art devices which are employed underground are difficult to insert, subject to blockage, or are designed for use about one plant. Many of these devices are complex and difficult to manufacture and employ.

None of the above inventions and patents, taken either singly or in combination, is seen to describe the instant invention as claimed.

The manner in which the instant apparatus overcomes the disadvantages of the prior art to produce a novel device will be understood as the description proceeds.

SUMMARY OF THE INVENTION

In accordance with the foregoing a general object of the invention is to provide an apparatus for dispensing fertilizer into the subsoil near a root system, which has an ease of insertion and removal, which is optimally placeable, which is efficient for multiple plant fertilization and of low cost and simple design.

The present apparatus provides a simple and effective design for dispensing fertilizer. The device consists of an inner and outer tubular section. Both sections have a lower pointed end and the inner tube is rotatably disposed within the outer tube. A port style opening is incorporated into the lower pointed end of the tubular sections. A hollow funnel is incorporated into the inner tube as well as a handle. A matching handle is incorporated into the outer tube. When these handles are aligned, the port in the inner and outer tube are out of alignment. This forms a solid outer tube section and pointed end which is then filled with granular fertilizer. These handles act as a mechanism to push the device into the soil. The upper part of the handle which is affixed to the inner tubular section is then rotated 90 degrees which brings both tube ports into alignment. As the tube is removed, the fertilizer pours through the ports and remains in the ground being deposited in the hole formed by the displaced soil.

Included in the handle mechanism is a mechanical alignment device which allows rotation only to the point where the ports fall in alignment. This also checks the alignment in the other direction simply indicating when both ports are closed to allow fertilizer to be placed into the inner tube.

The outer tube is also provided with a foot pedal to allow for the foot to be used to help insert the device into the soil while a threaded fitting allows an ordinary garden hose to be attached so that plant watering can also be effected beneath the surface.

The length and diameter of the apparatus will vary according to the size of the bush or tree which needs to be fertilized and the depth required for optimum fertilizer placement. A basic size may comprise a length of five feet, a diameter of about three quarters inches, an eight inch foot pedal perpendicular to the tube, and a handle about a foot long. These dimensions would be adjusted for various fertilization tasks.

Other features and advantages of this invention will be apparent during the course of the following description.

BRIEF DESCRIPTION OF THE DRAWINGS

FIG. 2 is a side elevation of the outer tube;

FIG. 3 is an exploded view of the inner tube above the outer tube prior to insertion;

FIG. 4 is a fragmentary side elevation of the inner tube;

FIG. 6 is a fragmentary perspective view of the inner tube nested in the outer tube, in the open port configuration;

FIG. 7 is a fragmentary perspective view of the second embodiment;

FIG. 8 is a partial sectional view of the second embodiment showing the closed port configuration;

FIG. 9 is a partial sectional view of the second embodiment showing the open port configuration; and FIG. 10 is a fragmentary perspective view of the second embodiment showing the port in a closed position.

DETAILED DESCRIPTION OF THE PREFERRED EMBODIMENTS

Figure 1:
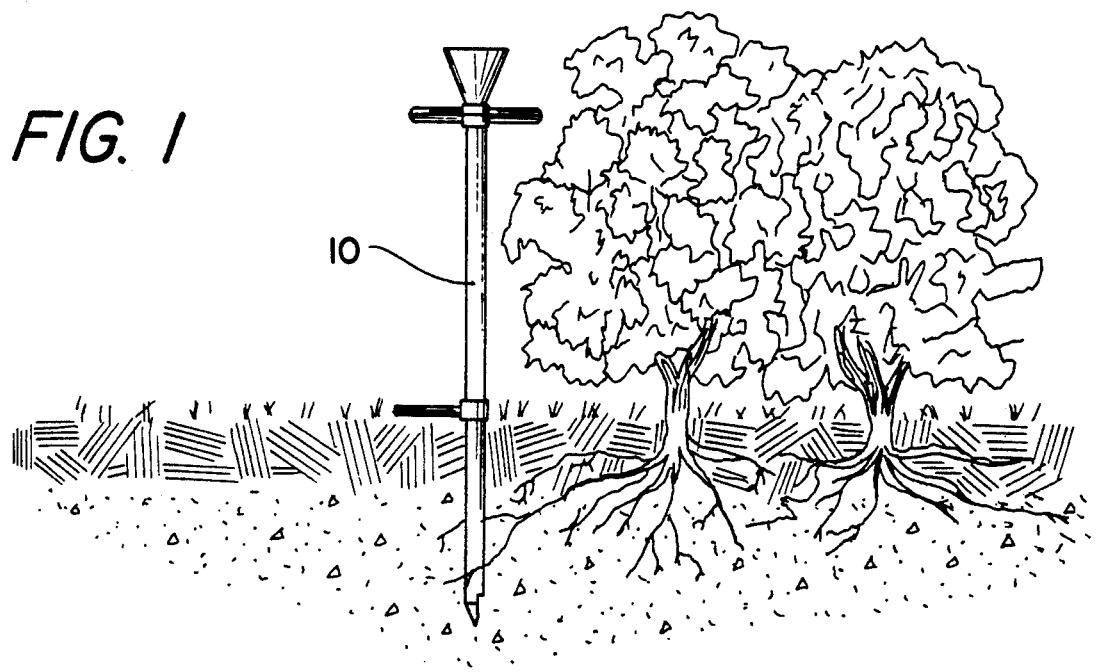
FIG. 1 is a perspective view of the apparatus being used in a root system.

The plant fertilizing apparatus 10 is shown generally in FIG. 1. In this way the device is shown to be placed in a subsoil near a root system of a bush. FIGS. 2 and 4 disclose the outer tube 20 and the inner tube 52. Both tubes have pointed cone ends, which facilitate easy entry into the soil. At the end of both tubes exists a generally rectangular port. The outer port 28 and the inner port 50 are formed to be located at just above where the cone angle begins to about one-half the distance between the base of the cone and the point. The port width is defined as being about one quarter the circumference of the tube. The outer handle 24 is shown affixed to element 22 which fixes the handle to the tube. Stop element 26 mates with a sleeve 56 to stop the inner tube rotation. Funnel 58 provided to facilitate easy insertion of the fertilizer. Inner tube handle 54 actuates the entire rotation of the inner tube bringing the inner tube port in and out of alignment with the outer tube port. Handle 54 is firmly affixed to element 55.

FIG. 3 shows the inner tube 44 prior to being inserted into the outer tube 30. Outer handle 40 remains stationary while inner handle 46 can rotate ninety degrees which brings the inner port 42 into alignment with the outer port 36. Stop element 38 slides in sleeve 49 which restricts the rotation of the inner tube to ninety degrees. Funnel 48 allows for easy fertilizer loading. Foot pedal 32 is mounted on the outer tube by foot pedal mount 34. By grasping both the inner and outer handles and using the foot one can easily thrust the mechanism into an ideal location near a root system.

Figure 5:
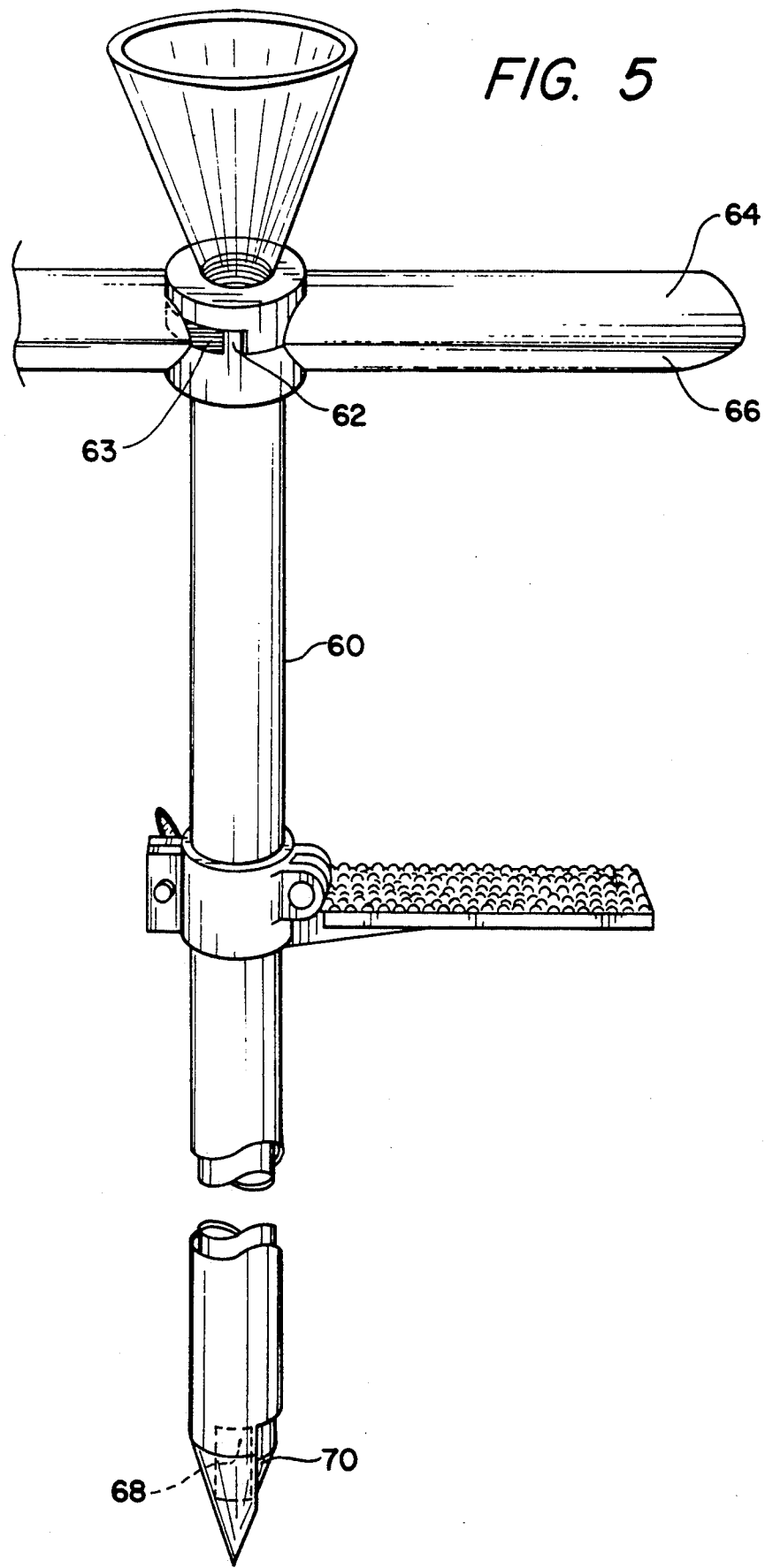
FIG. 5 is a fragmentary perspective view of the inner tube nested in the outer tube, in the closed port configuration.

FIGS. 5 and 6 disclose the general functioning of the plant fertilizing device 60. In FIG. 5 the outer handle 66 and the inner handle 64 are in alignment. In this manner they are easily grasped by the user. Stop element 62 is engaging the left side of the recessed cavity 63 which prevents any counterclockwise rotation. Inner opening 68 is obstructed by the outside tube and the outer opening is obstructed from the inside by the inner tube member as indicated at 70 in FIG. 5. In this configuration, the device is ready for operation. Fertilizer of the granular type is loaded via the upper funnel. The handles are grasped and the foot pedal engaged and the device is thrust into the ground. At this point the inner tube handle is rotated 90 degrees in a clockwise fashion where the recessed cavity engages the stop element on the right side preventing further rotation. Inner and outer openings come into alignment near 72 and the entire fertilizer device is withdrawn. The action of removing the device allows the granular fertilizer to remain in the hole formed by the displaced soil.

An alternative embodiment of the invention is shown generally in FIGS. 7-10.

The fertilizer device 90 is shown in FIG. 7. A single long tube is provided with internal structure. The opening plate 91 is shown in the closed position. The plate in this position is integral with the tube. Rod 92 communicates between lever 85 and plate 91. The rod is appropriately connected between the lever and the plate to allow the plate to be raised and lowered in a smooth and easy fashion. Funnel 89 is provided for easy insertion of the granular fertilizer, and is removable to allow an ordinary garden hose to be attached which would allow underground watering. Handle 89a allows hand grasping for maximum placement. FIG. 8 shows another view of the fertilizer device showing more specific internal structure. The lever 85A is shown in the position which allows the plate 91A to remain integral with the tube, forming a solid tube. The plate is nested in the plate support and guide 90. When the lever is in the lower position, designated generally as 85B, the plate is in an upper position generally designated as 91B. An opening 95 is formed in the tube allowing the fertilizer to be dispensed when the device is removed from the soil. Element 88 generally shows the funnel or hose threading which allows these devices to be screwed on and off. In FIG. 10 the inserting arrangement is shown. Plate support and guide 90 is shown plus the rod 90 and its appropriate connection means. Guide 93 adds stability and support to the plate in both up and down positions. Through use of the foot pedal the fertilizer applicator is thrust into the ground, the lever actuated, thus raising the plate, and the applicator removed from the soil. In this fashion the granular fertilizer remains in the hole formed from the displaced soil.

It is to be understood that the present invention is not limited to the embodiments described above, but encompasses any and all embodiments within the scope of the following claims.

I claim:

1. A fertilizer dispenser comprising:
   hole making means for forming a hole in the ground beneath a ground surface, and including a tube having a first pointed end;
   fertilizer storage means comprising means defining a chamber interiorly of said tube for holding a quantity of fertilizer;
   fertilizer dispensing means comprising means defining a primary port through both said tube and said tube first pointed end, at the junction of said tube and said tube first pointed end, said primary port thus being defined partially through said tube and partially through said tube first pointed end; and
   fertilizer dispensing control means including plate means, through said primary port, and control actuation means manipulable to displace said plate means from said primary port, thereby allowing fertilizer to exit from said fertilizer storage means, through said primary port, directly into the hole, upon mere withdrawal of said fertilizer dispenser from the hole made by said hole making means.

2. The fertilizer dispenser according to claim 1, wherein said control means includes a hollow inner tube with a second pointed end and said plate being part of said hollow inner tube.

3. The fertilizer dispenser according to claim 1 wherein said control means includes a handle attached to said hollow inner tube on an end opposite said second pointed end.

4. The fertilizer dispenser according to claim 2, wherein said hollow inner tube includes an inner, secondary port, said inner, secondary port being dimensioned similarly to said primary port.

5. A fertilizer dispenser according to claim 4 wherein said plate means is defined by said hollow inner tube and said second pointed end surrounding said inner port.

6. A fertilizer dispenser according to claim 5 wherein said inner secondary port is locates partially on said inner and partially on said second pointed end.

7. A fertilizer dispenser according to claim 2 where the said hollow inner tube is dimensioned concentrically with respect to said tube and is located interiorally of said tube.

8. A fertilizer dispenser according to claim 7 wherein said control actuation means rotate said inner tube, permitting alignment of said inner port and said primary port, thus allowing the fertilizer to exit when said hole making means is removed from the hole made by said hole making means, there further being stop means to arrest rotation at the said port alignment configuration.

9. A fertilizer dispenser according to claim 2 said inner tube has a funnel attached, having thread means which will allow a hose to be attached.

10. A fertilizer dispenser according to claim 1 wherein said hole making means further includes a foot pedal mounted on said outer tube.

11. A fertilizer dispenser according to claim 1 wherein said hole making means is composed of metal.

12. A fertilizer according to claim 1 wherein control means includes a lever mounted on the tube, said lever attached to said plate by connecting means.

13. A fertilizer dispenser according to claim 12 wherein said connecting means consists of a rod.

14. A fertilizer dispenser according to claim 12 whereby a plate means guide, generally cylindrical and dimensioned to fit interiorly of said tube, is provided with two plate guide channels in which said plate rests, providing guidance and support during plate means motion.

15. A fertilizer dispenser comprising:
hole making means for forming a hole in the ground beneath a ground surface, and including a first tube having a first pointed end;
a second tube, having a second pointed end, said second tube being dimensioned concentrically with respect to said first tube and rotatably interfitted therewithin;
fertilizer storage means comprising means defining a chamber interiorly of said second tube for holding a quantity of fertilizer;
fertilizer dispensing means comprising means defining a primary port through both said first tube and said first tube first pointed end, at the junction of said first tube and said tube first pointed end, said primary port thus being defined partially through said first tube and partially through said tube first pointed end, and means defining a secondary port through both said second port and said second tube pointed end, said second port thus being defined partially through said second tube and said second tube pointed end; and
fertilizer dispensing control means including plate means, through said primary port, and control actuation means manipulable to displace said plate means from said primary port and align said primary and secondary ports, thereby allowing fertilizer to exit from said fertilizer storage means, through said primary and secondary ports, directly into the hole, upon mere withdrawal of said fertilizer dispenser from the hole made by said hole making means.

16. A fertilizer dispenser comprising:
hole making means for forming a hole in the ground beneath a ground surface, and including a tube having a first pointed end;
fertilizer storage means comprising means defining a chamber interiorly of said tube for holding a quantity of fertilizer;
fertilizer dispensing means comprising means defining a primary port through both said tube and said tube first pointed end, at the junction of said tube and said tube first pointed end, said primary port thus being defined partially through said tube and partially through said tube first pointed end; and
fertilizer dispensing control means including plate means, through said primary port and vertically, slidably received therein, and control actuation means manipulable to displace said plate means vertically above and away from said primary port, thereby allowing fertilizer to exit from said fertilizer storage means, through said primary port, directly into the hole, upon mere withdrawal of said fertilizer dispenser from the hole made by said hole making means.

* * * * *